J. C. BERTSCH.
ROTARY REFRIGERATING APPARATUS.
APPLICATION FILED FEB. 24, 1913. RENEWED MAY 19, 1914.

1,145,226.

Patented July 6, 1915.
6 SHEETS—SHEET 2.

WITNESSES:
Edith Smith
Maria J. Barrett

INVENTOR
John C. Bertsch
BY
ATTORNEY

J. C. BERTSCH.
ROTARY REFRIGERATING APPARATUS.
APPLICATION FILED FEB. 24, 1913. RENEWED MAY 19, 1914.

1,145,226.

Patented July 6, 1915.

WITNESSES:
Edith L. Smith
Maria L. Barrett

INVENTOR
John C. Bertsch
BY
Geo. E. Finn
ATTORNEY J. C. BERTSCH.
ROTARY REFRIGERATING APPARATUS.
APPLICATION FILED FEB. 24, 1913. RENEWED MAY 19, 1914.

1,145,226.

Patented July 6, 1915.

WITNESSES:

INVENTOR
John C. Bertsch
BY

ATTORNEY

UNITED STATES PATENT OFFICE.

JOHN C. BERTSCH, OF FORT WORTH, TEXAS.

ROTARY REFRIGERATING APPARATUS.

1,145,226. Specification of Letters Patent. Patented July 6, 1915.

Application filed February 24, 1913, Serial No. 750,429. Renewed May 19, 1914. Serial No. 839,646.

*To all whom it may concern:*

Be it known that I, JOHN C. BERTSCH, a citizen of the United States, residing at Fort Worth, in the county of Tarrant and State of Texas, have invented certain new and useful Improvements in Rotary Refrigerating Apparatus, of which the following is a specification.

My invention relates to improvements in refrigerating apparatus operating by the expansion and compression of fluids, such as ammonia, carbon dioxid, sulfurous anhydrid, or the like, and particularly to the rotary type of refrigerating apparatus, in which the entire machinery is inclosed within a hermetically sealed casing, to which are coupled condensing and refrigerating coils, the entire combination rotating around a common axis.

My invention comprises an improved construction of the several parts comprising the complete apparatus, and particularly improved arrangements for the regulation of the working pressures and cooling surfaces to make them suitable for any kind of domestic or industrial service.

The chief object of my invention is to obviate most of the cost of attendance, and also all losses of lubricant and working fluid.

Another object of my invention is to greatly reduce the power required for operating a refrigerating apparatus by working with nearly saturated gases or vapors during the entire cycle of operation.

Still another object of my invention is to provide such a construction of the apparatus as will withstand high pressures, will work automatically, can be safely dismantled, which allows an exchange, enlargement or modification of the condensing and refrigerating surfaces in size and shape to suit all kinds of conditions, and which permits the regulation of the working pressures to suit changing conditions and insures the most economical operation.

Another object of my invention is to distribute the working load over one whole revolution; to secure a perfect circulation of the working fluid, and to prevent the accumulation of lubricating oil in the condensing and refrigerating coils.

Other objects and advantages of my invention will be fully described in the following specification, and the novel features pointed out in the claims.

Heretofore the rotary refrigerating apparatus was so constructed that it could not withstand high pressures, and it was therefore limited to the use of sulfurous anhydrid, which is the poorest refrigerating fluid known. The older type of rotary apparatus, on account of its peculiar construction, permitted the operation of only one compression cylinder with one discharge for every revolution, thereby causing the machine to run idle for every one half of a revolution, and concentrating most of the working load to a small part of each revolution.

In the older type of rotary refrigerating apparatus the compressor is placed within the condenser which is the hottest part of the entire apparatus, thereby reducing greatly the volumetric efficiency of the compressor and accumulating a great amount of heat of compression. Furthermore, this older type of apparatus has no means for regulating the working pressures for changing conditions, and the same amount of fluid, condensing and cooling surfaces are used for all kinds of services, conditions and temperatures, which results in many cases in a great waste, in other cases in a great deficiency, and only in a few cases in an economical operation. All of these defects, omissions and disadvantages I correct with my invention, comprising a number of compressors, suitable for working under high pressures, preferably with the best refrigerating fluid known, namely anhydrous ammonia, which are mounted on a shaft and inclosed within a casing which forms either the whole or only a part of the refrigerator, or only an independent housing for the machinery, and to which are coupled a condenser made of pipe coils, and also additional or independent refrigerating surfaces consisting of pipe coils, all arranged for regulating the working pressure at will, for disconnecting the condenser and refrigerator coils, and for operating one or a number of separate refrigerating tanks.

For a clear understanding of my invention I will first describe every part of the apparatus, and then outline the operation of same.

In the drawings Fig. 21 is an inside elevation of the compressor housing shown in Fig. 17, with shafts broken off and working weight shown in dotted lines while in working condition during clockwise rotation, showing the parts actuating the compressor pistons, and a part of the compressors and vapor passages broken of. Fig. 22 is a section along the broken line $b$—$b$ of Fig. 21 looking downward. Fig. 23 is an enlarged section of a modified form of self closing liquid stop valve shown in Figs. 17 and 21. Fig. 24 is an end elevation of the evaporator shaft, showing the two vapor and two liquid passages within one shaft, as shown in Fig. 17.

Figure 1:
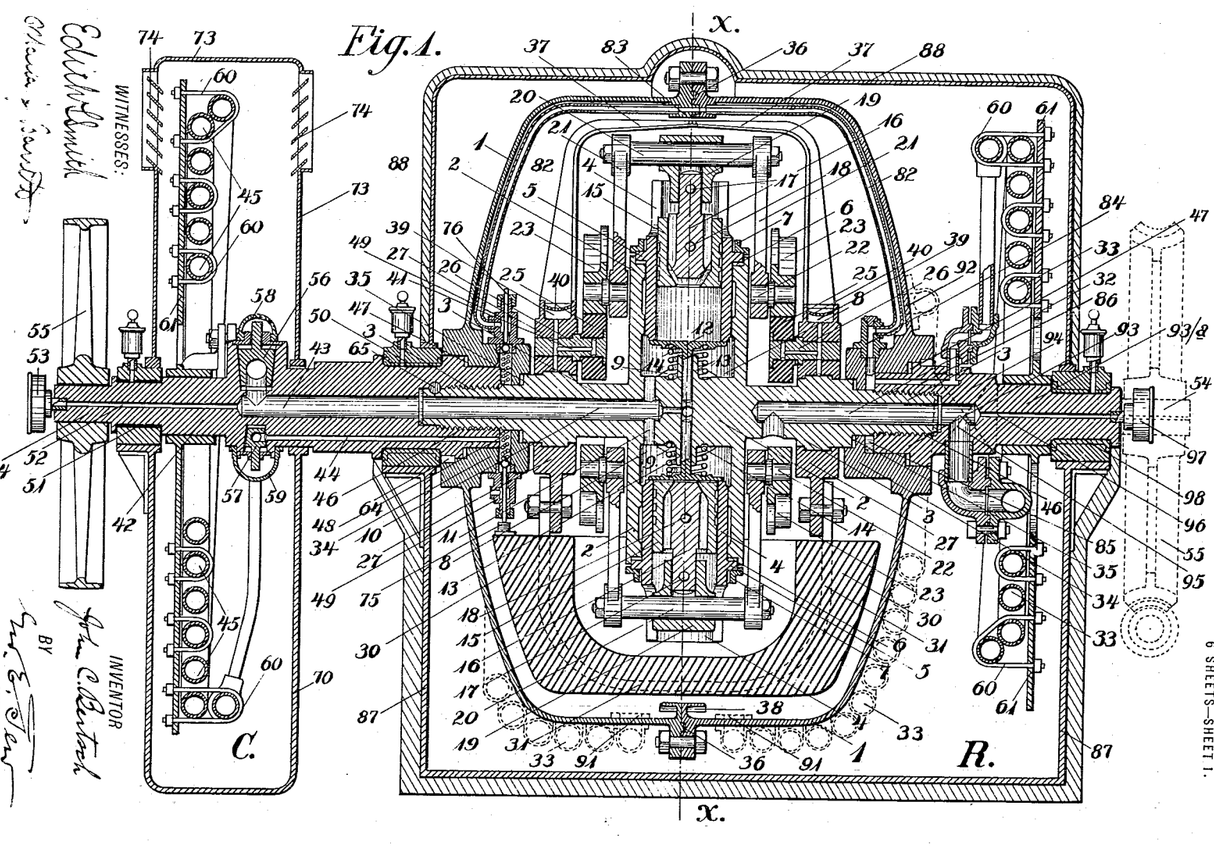
—Figure 1 is a longitudinal section through the center of the apparatus while at rest, showing the preferred form of condenser and a certain combination of refrigerating surfaces.

Within a hermetically sealed casing, made of metal suitable for the working fluid used, and made in halves, is located the entire machinery, consisting of one or more, preferably four, compressors for the compression of the vapors of any kind of refrigerating fluid, preferably ammonia, the outside surface of casing 1 forming the whole or only a part of the cooling surface of refrigerator R. Compressor body 2, Figs. 3, 5 and 6, tightly connected to and resting upon shaft 3, carries cylinder sleeves 4, which are fastened to body 2 by collars 5 and glands 7, and form with gaskets 6 the discharge chambers 8, which communicate with each other through ports 9. One side of shaft 3, (Fig. 1) carrying body 2 in the middle, is made hollow and forms with passage 10, which communicates with chambers 8 by one or more ports 11, the discharge concoils.

nection between the compressors and condenser coils within condenser C. The ends of shaft 3 have screw threads for making a tight connection between the casing 1 and the shafts of the condenser and refrigerator Discharge valves 12 form the cylinder heads, slide in guides 13 and are balanced by springs 14. Pistons 15 within sleeves 4 contain the suction valves 16, which are limited in their travel by pins 17 and fastened to crosshead 19 by pins 18. Crosshead 19 forms the bearing for pin 20, to each end of which is rigidly connected one end of connecting rod 21, each of which has at its other end the bearing for pins 22. The outer ends of sleeves 4 are slotted to form a passage for pins 20, and form the guide for crosshead 19.

On each side of body 2, (Figs. 4 and 5) is located a crank plate 23, to which are rigidly connected the pins 22, and which are always held parallel with the axes of the compressor cylinders by four pairs of cranks 24 of which each pair is connected together by a shaft 28. Crank shafts 28 have their bearings on the circumference of the body 2, to which they are held by covers 29, and crank plates 23 contain the bearings for pins of cranks 24. By means of the four double cranks 24 the two crank plates 23 move exactly together and prevent a dead center on any compressor, of which any number may be operated by one pair of crank plates 23, held in position by only one member overbalancing the working load of all compressors.

Figure 2:
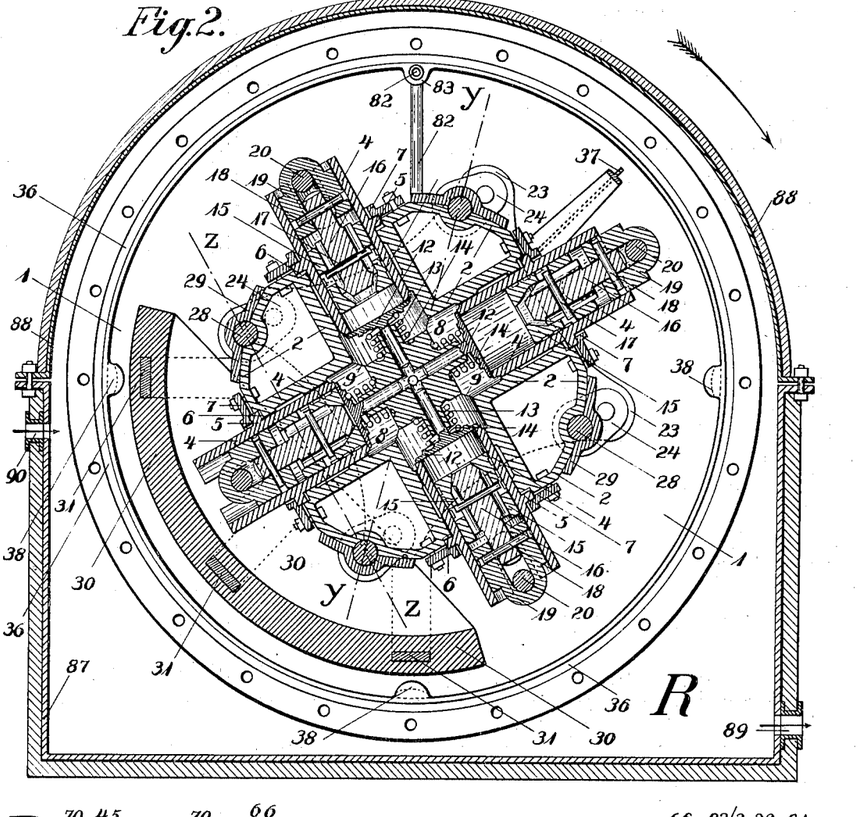
Fig. 2 is a cross section along line $x$—$x$ of Fig. 1, showing the position of all working parts while operating in clockwise rotation.

Crank plates 23 have a centrally located circular opening through which shaft 3 passes freely, and the circumference of which rests upon rollers 25, preferably provided with ball bearings, running on pins 26 rigidly connected to bearing collars 27, which are also preferably provided with ball bearings and run upon shaft 3. To bearing collars 27 is connected a weight 30 by straps 31, (Figs. 1, 2 and 4) cast within weight 30 which is preferably made of lead. Weight 30 holds the rollers 25 in relatively eccentric position while plates 23 together with shaft 3 and all compressors revolve, thereby causing the pistons 15 to reciprocate the plates 23 revolving around an axis eccentric to the shaft 3 which carries the cylinders.

Figures 12, 13:
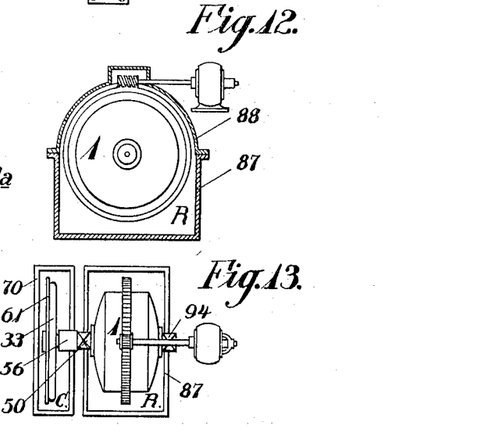
Fig. 12 is a diagram of an elevation of the refrigerator, showing the apparatus driven by an electric motor and a worm, the worm gear being placed over the flanges of the compressor casing.
Fig. 13 is a plan diagram of the simplest form of apparatus, driven by electric motor with pinion, the spur gear being placed over the flanges of the compressor casing.

Shaft 3, Fig. 1, performs other duties besides carrying all compressors and weight 30, and forming discharge passage 10. It also forms a tie rod between the heads of casing 1 to prevent any bulging of the casing while the apparatus is not in operation and therefore under high pressure caused by equalizing of condenser pressure with the refrigerator pressure. Besides, the half of shaft 3 opposite passage 10 is solid when the apparatus has its simplest form as shown in Fig. 13, in which the surface of the casing 1 is sufficiently large for refrigerator R. But if the surface of casing 1 is not sufficient and additional surface is provided in the form of separate refrigerating coils coupled to casing 1, shaft 3 has a passage 32, forming a suction connection for pipes 33 within refrigerator R.

To the heads of casing 1 are welded caps 34, in which shaft 3 rests, and which are internally stepped off for the reception of gaskets for tightly closing passage 10 against the inside of casing 1, and the latter also against the outside atmosphere. Gaskets 35 within caps 34, together with gaskets 36 between the flanges of the two halves of casing 1, seal the latter completely.

All parts of the compressors are fully lubricated by the splashing of oil and liquid fluid contained in casing 1, but the rollers 25 and bearing collars 27 are oiled by a wiper 37, carried by bearing collars 27, and constantly supplied with oil by a number of lugs 38 fastened to the inside circumference of casing 1, which prevent the wiping off of grit accumulating on the inner circumference of casing 1.

Wiper 37 consists of a frame placed on top of bearing collars 27, the flanges or ribs of which lead the oil into oil boxes 39 located on top of bearing collars 27 and provided with fine meshed screens 40. From boxes 39 the oil passes by gravity through ports 41 within pins 26 to the bearing surfaces of rollers 25 and bearing collars 27.

Upon a shaft 42, (Fig. 1) containing a passage 43 as a continuation of passage 10, for passing the compressed vapors to the condenser, and a passage 44 for passing the liquid fluid from the condenser to casing 1, are mounted any desired length of pipes 45, wound into one or a number of coils, for the condensation of the fluid vapors compressed in casing 1. Shaft 42 is coupled to one end of shaft 3 by a screw thread 46, and stepped off to fit the steps within caps 34, closing with gasket 47 the apparatus tightly against the outside atmosphere, and forming within caps 34 an annular space 48, see Fig. 7, for the distribution of the liquid fluid coming through passage 44 from the pipes 45, regardless of the relative position of passage 44 and the self closing stop valve 49 connected to caps 34. Shaft 42 is locked to casing caps 34 by keys 64, and to shaft 3 by pins 65, and rests upon bearings 50 and 51.

As an extension of passage 43, a small passage 52 is provided for a connection with gauge 53, placed at the extreme end of shaft 42 for registering the condensing pressure within pipes 45.

Shaft 42 may be extended beyond bearing 51 for the reception of a pulley or gear 55 for driving the entire apparatus, and is provided at the end of passage 43 with a stop valve 56, and at the end of passage 44 with a combination regulating and stop valve 57 for the regulation of the flow of liquid fluid to the refrigerating pipes, and consequently for the regulation of the working pressure within casing 1 for any desired service. If both valves 56 and 57 are closed, the entire condenser may be removed from the apparatus and if only valve 57 is closed and the apparatus still running, the refrigerator coils together with casing 1 and the compressors may be exhausted and emptied, and can be dismantled after closing valve 56, all of the working fluid being then stored within condensing pipes 45. Valve 56 is closed and protected against the atmosphere by a cap 58, and valve 57 likewise by a cap 59.

Figures 8, 9, 10, 14:
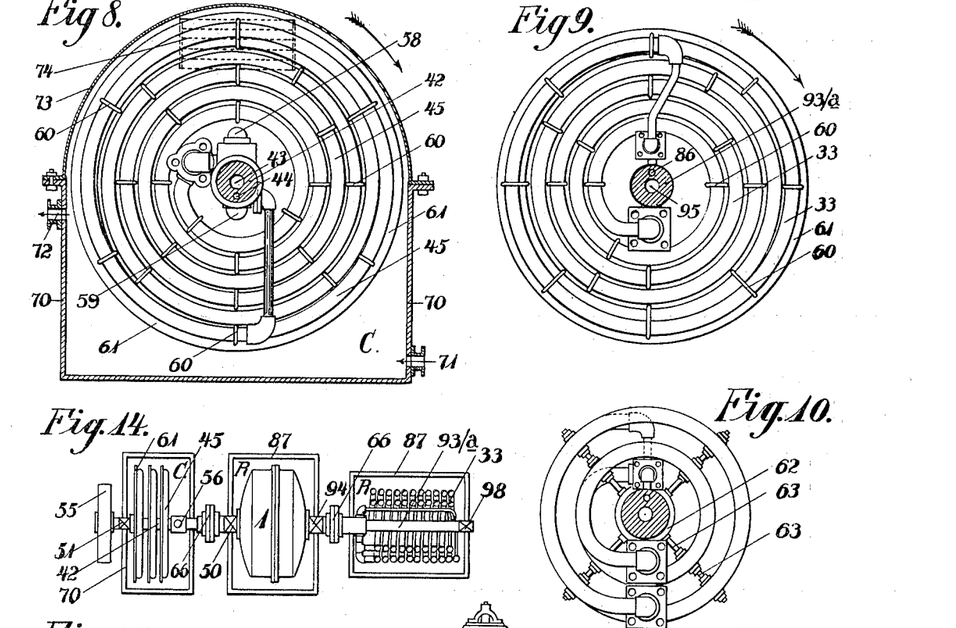
Fig. 8 is an elevation of the preferred form of condenser coil in one half the scale of Fig. 1, showing a section through the condenser tank with cover.
Fig. 9 is an elevation of one form of refrigerating coil in one half the scale of Fig. 1.
Fig. 10 is an end view of another form of double coil for either condenser or refrigerator.
Fig. 14 is a plan diagram of a complete apparatus with a modified arrangement, showing condenser coils as shown in Fig. 8, refrigerator coils as shown in Fig. 10, and the shafts with couplings shown in Fig. 11, all driven by belt and pulley at the condenser end, and arranged with two independent refrigerating tanks.
Figure 15:
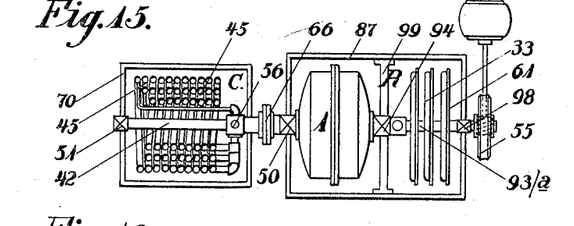
Fig. 15 is a plan diagram of another modified arrangement showing the condenser coils as in Fig. 10, the refrigerator coils as in Fig. 9, a shaft coupling as in Fig. 11 between condenser and compressor casing, with one refrigerator tank and middle bearing within same, all driven by electric motor with worm, and worm gear placed at refrigerator end of shaft.

Condensing pipes 45 are wound either to flat coils as shown in Figs. 1 and 8, and fastened by straps 60 to carrying plates 61 resting upon shaft 42; or they may be wound into spiral coils as shown by Fig. 10, and fastened to shaft 42 by carrying rings 62 and stays 63. The diagrams of Figs. 13 and 14 show pipes 45 made up in flat coils, and diagrams Fig. 15 shows these pipes made up in spiral coils. The flat coils formed by pipes 45, shown as a condenser in Figs. 1, 8, 13 and 14 are the preferred form, for reason explained below in connection with the evaporator coils, the spiral coils shown as a condenser in Figs. 10 and 15, being only a modification of the former.

Figure 3:
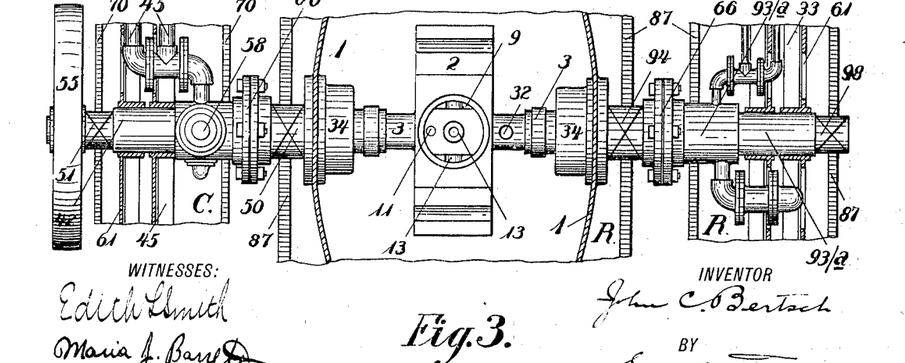
Fig. 3 is a plan view of a modified form of the shafts for compressors, condensers and refrigerator coils, with parts removed and the casing, pipe coils and tanks broken away.
Figures 4, 5, 6, 7:
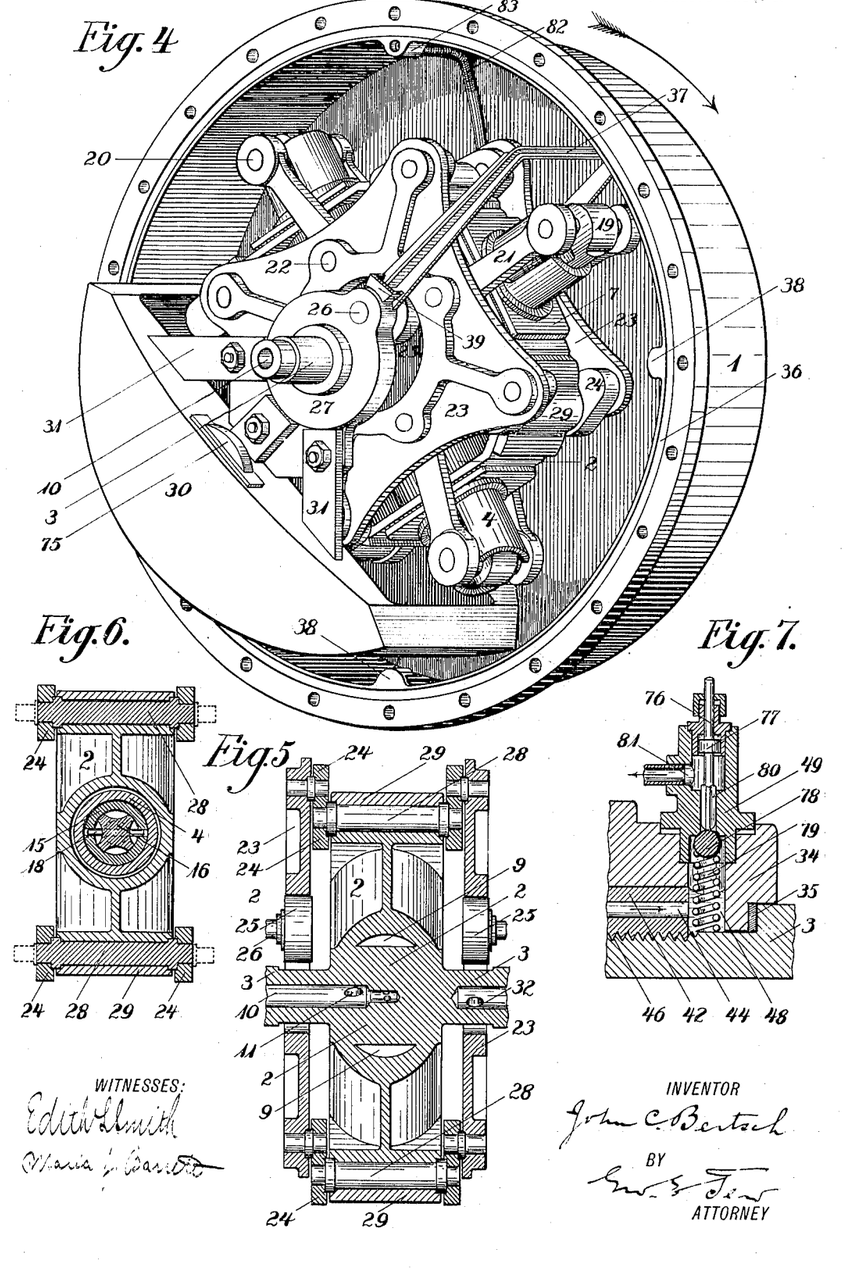
Fig. 4 is a perspective view of the compressors and principal working parts shown in Figs. 1 and 2 while in clockwise rotation, with one half of the casing and the whole refrigerator tank removed.
Fig. 5 is a section along line $y$—$y$ in Fig. 2, showing the compressor body with crank plates, cranks and rollers, the compressor shaft being broken off.
Fig. 6 is a section along line $z$—$z$ of Fig. 2, showing the compressor body with cross section through cylinder sleeves, piston and suction valve, and also a section of the cranks with their shaft.
Fig. 7 is an enlarged section of the self closing liquid stop valves shown in Fig. 1.

For larger size apparatus, shaft 42 is modified as shown by Fig. 3, to enable the removal of condenser C without opening screw thread 46. A shaft coupling 66 is placed between bearing 50 and valves 56 and 57. Coupling 66, shown in detail in Fig. 11, has a gasket 67 for closing tightly gas passage 43, and a gasket 68 for closing tightly the annular space 69, which is provided for forming a free passage for the liquid fluid regardless of the relative positions of passage 44 on both sides of coupling 66 of which one may be located as shown to the right of Fig. 11 and the other as shown to the left of Fig. 11 in dotted lines.

The condenser coils are partly submerged within a tank 70, filled with water for condensing the compressed vapors within pipes 45. Tank 70 is provided with water-inlet 71, outlet or overflow 72, see Fig. 8, and with a cover 73, which contains near the top louver shaped ventilators 74 for the escape of heat and moisture. For economizing cooling water, the overflowing and heated water may be re-cooled by any of the well known devices, such as air circulating fans, cooling towers, sprays, or the like.

From Fig. 8 it is apparent that the winding of pipes 45 in flat or spiral coils must be in a certain relation to the direction in which the coils rotate. For example, all coils shown in drawings are assumed in clockwise rotation, for which pipes 45 must be wound for a counter-clockwise travel of the incoming vapor, thereby forcing all particles of liquid fluid and oil toward the liquid end of a coil, or away from the vapor inlet, preventing a choking of pipes 45 as fully explained in connection with the evaporator coils.

The liquid fluid accumulated before regulating valve 57, passes through the opening of said valve into passage 44 of shaft 42, filling annular space 48. A cam 75, fastened to weight 30, (Figs. 1 and 4) pushes stem 76 of valve 49, (Fig. 7) cushioned and held in place by plunger 77, inwardly, with every revolution of casing 1, thereby lifting ball 78 from its seat, to which it is held by spring 79 and the liquid under condensing pressure, allowing the liquid fluid to pass through ports 80 of stem 76 and out through outlet 81 either direct into casing 1 or into pipe 82, (Figs. 1, 2 and 4) or into both at the same time if desired.

From pipe 82, fastened to the inside of casing 1 and connected together at the casing flanges by lugs 83, the liquid fluid passes through connecting fitting 84 into annular space 85 formed between cap 34 and the shaft of the refrigerating pipes 33.

When the apparatus is not in operation and stopped in a certain position marked on pulley or gear 55, in which balls 78 are pressed to their seats, no liquid fluid can pass through valves 49.

Figure 16:
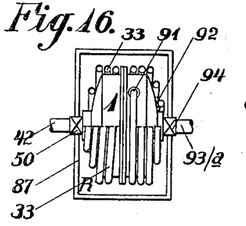
Fig. 16 is a plan diagram with part section of compressor casing alone, with pipe coils wound around the same.

In the simplest form of apparatus as shown by Fig. 13, casing 1 forms with its surface the refrigerator, consisting of a well insulated tank 87, with insulated cover 88. Tank 87 is partly filled with brine, a solution of common salt or chlorid of calcium in water, and of a strength or specific gravity suitable for temperatures to be produced. An outlet 89 for the coldest brine, and an inlet 90 for the warmest brine, are provided in tank 87, and the brine is circulated in any well known manner for refrigerating either space, liquids and food stuffs, or for making artificial ice. If the apparatus shall be used for cooling air alone, the warm air may be circulated through the cover 88, or through tank 87 and cover 88 alike, in which case the brine is dispensed with, and only a small amount trickled over casing 1 to prevent the accumulation of heavy frost on the cold surface of casing 1 by the moisture of the air. If the surface of casing 1 is insufficient for the service required, it may be increased by winding pipes 33 around the casing, as shown by dotted lines on the lower part of Fig. 1 and in diagram of Fig. 16. In both cases only one valve 49 with a free outlet 81 is required, and pipe 82, lugs 83, fitting 84, annular space 85 and passage 86 are not required, the liquid fluid being discharged direct into casing 1, from which pipes 33 are supplied through connection 91, the vapors formed in pipes 33 entering casing 1 through connection 92, shown in Figs. 1 and 16. In this simplest form of apparatus (Fig. 13) passage 32 is also not required, and the end of shaft 3 opposite condenser C remains solid and is fastened to cap 34 by a nut 93 with a screw thread 46 and stepped off to fit cap 34. Gasket 47 closes the casing tightly, and nut 93 forms bearing 94 (Figs.

Figures 17, 18, 19, 20:
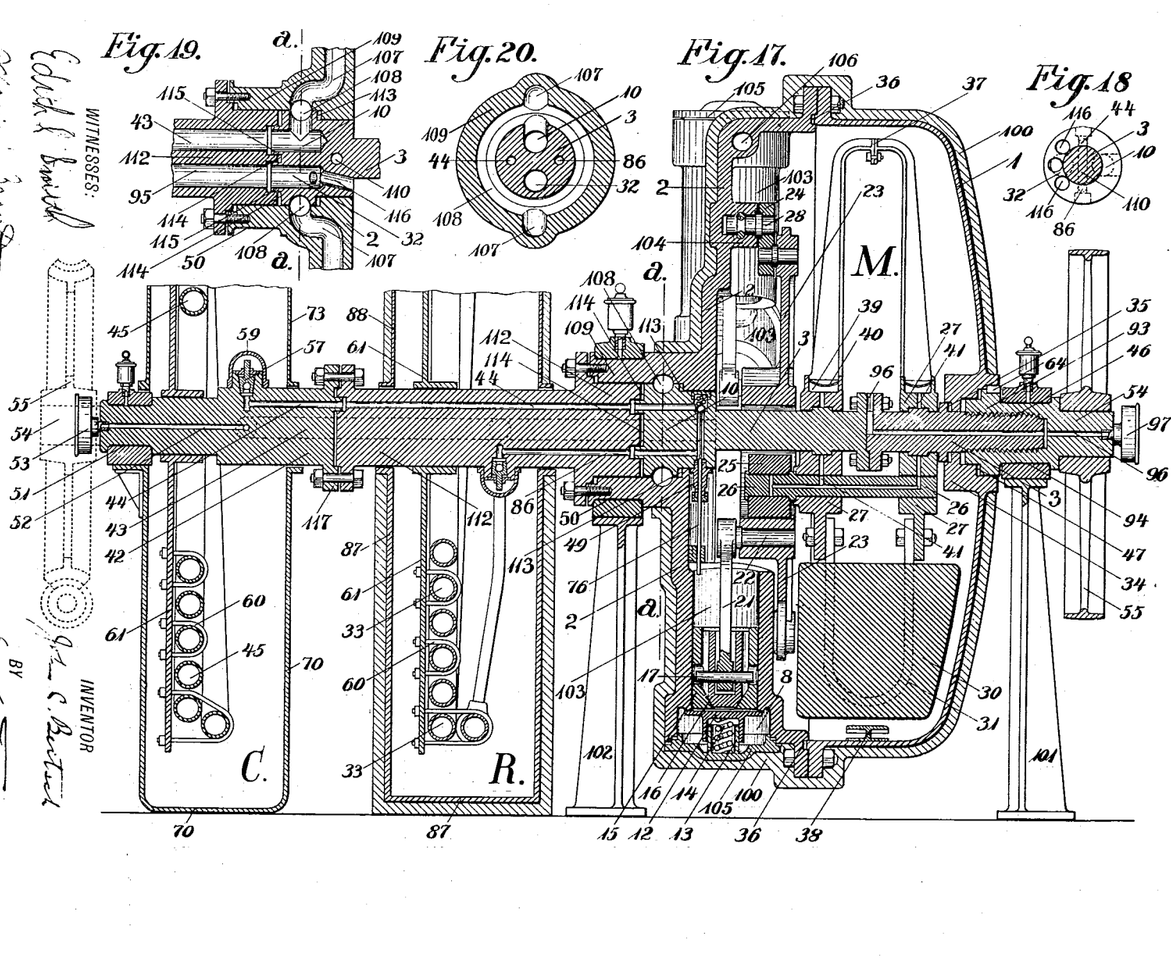
Fig. 17 is a longitudinal section along the broken line $w$—$w$ of Fig. 21 while the apparatus is at rest, showing a modified construction of compressors and working parts, with insulated compressor housing and condenser and refrigerator placed side by side of each other, both shown with upper part broken off.
Fig. 18 is a cross section of the compressor shaft of Fig. 17, showing the vapor outlets in elevation.
Fig. 19 is a horizontal section through the center of broken off parts of the compressor body, compressor shaft and evaporator shaft shown in Fig. 17, showing the coupling of vapor and liquid passages.
Fig. 20 is a cross section along line $a$—$a$ of Figs. 17 and 19.

13 and 17, also dotted lines in Fig. 1) and may be extended to receive pulley or gear 55 for driving the apparatus.

For still further increasing the refrigerating surface, or for dispensing with the use of casing 1 as a refrigerating surface and using same only as a housing for the compressors, as shown in Fig. 17 in which case the casing may be well insulated and not placed within a tank 87, a shaft 93ª, having one end shaped like nut 93, is coupled to shaft 3. On shaft 93ª, containing a passage 95 as a continuation of passage 32 in shaft 3 for passing the vaporized fluid from pipes 33 into casing 1, also a passage 86 for passing the liquid fluid from the condenser to pipes 33, are mounted any desired number of feet of pipes 33, wound into one or any number of coils for the vaporization of the liquid refrigerant. Shaft 93ª is coupled, tightened and locked to shaft 3 and casing 1 in exactly the same manner as condenser shaft 42, being in all details a duplicate of the latter. Vapor and liquid stop valves, not shown on drawings, may be placed exactly in the same way as has been done with shaft 42, serving the same purpose as described with shaft 42 for condenser C.

As an extension of passage 95, a small passage 96 is provided for a connection with gage 97, placed at the extreme end of shaft 93ª for registering the suction pressure within casing 1 and pipes 33. Shaft 93ª rests in bearing 98, Figs. 1, 14 and 15, and may be extended beyond bearing 98 for the reception of a pulley or gear 55 for driving the apparatus, as shown in dotted lines in Fig. 1, if the main drive is not desired on the condenser side of the apparatus. Or both shafts 42 and 93ª may be provided with pulleys or gears 55, one side for the main drive of the apparatus, and the other side for driving auxiliaries, such as brine circulating pumps, ventilating fans for air circulation, propellers for ice tanks, or the like.

Refrigerator pipes 33 are wound either to flat coils as shown by Figs. 1 and 9, fastened by straps 60 to carrying plates 61, resting upon a shaft 93ª, or in spiral coils as shown by Fig. 10, fastened to shaft 93ª by carrying rings 62 and stays 63. Diagram Fig. 15 shows the flat coils, and diagram Fig. 14 shows the spiral coils. The flat coils formed by pipes 33, shown as the evaporator in Figs. 1, 9 and 15, are the preferred form, as will be explained later, the spiral coils shown being only a modification of the former.

From Figs. 9 and 10, showing a clockwise rotation of the refrigerating coils, it may be seen that the winding of pipes 33 must be in a certain relation to the direction in which the coils rotate, in order to free them constantly of the lubricating oil and to distribute the liquid fluid evenly over a large internal pipe surface. For a clockwise rotation, the winding must permit the liquid fluid supplied through passage 86 to travel within pipes 33 in a counter-clockwise direction, thereby forcing the vapors toward passage 95 and emptying the lubricating oil intermixed with the liquid fluid into casing 1, assisted by the flow of the vapor.

For larger apparatus, shaft 93ª is modified as shown by Fig. 3, to permit the removal of the refrigerator coils without opening screw thread 46, and also for dividing the refrigerator R into a number of tanks 87, as shown by Figs. 3 and 14.

Figure 11:
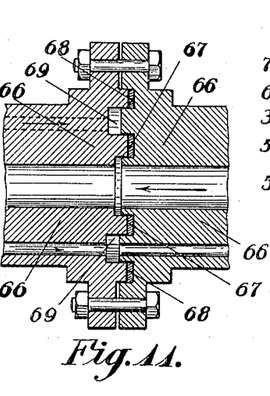
Fig. 11 is an enlarged section of the shaft coupling shown in Fig. 3, with the shafts broken off.

Next to bearing 94 is placed a shaft coupling 66, shown in detail by Fig. 11 with gaskets 67 and 68, and with annular space 69, as fully described and for the purpose stated for coupling 66 of condenser shaft 42. All refrigerator coils are partly submerged in brine within a tank or a number of tanks 87, as described before for casing 1.

Bearing 94 is omitted in Fig. 1 as not required for a short shaft 93ª with only one refrigerating coil, for which bearing 94 could be placed between casing 1 and coil, supported by a bar across tank 87, omitting bearing 98 and operating the coil overhanging.

For a longer shaft 93ª with a number of coils in one tank 87, both bearings 94 and 98 are required, of which bearing 94 is supported by a stand or a cross bar 99, as shown in Fig. 15.

Figures 21, 22, 23, 24:
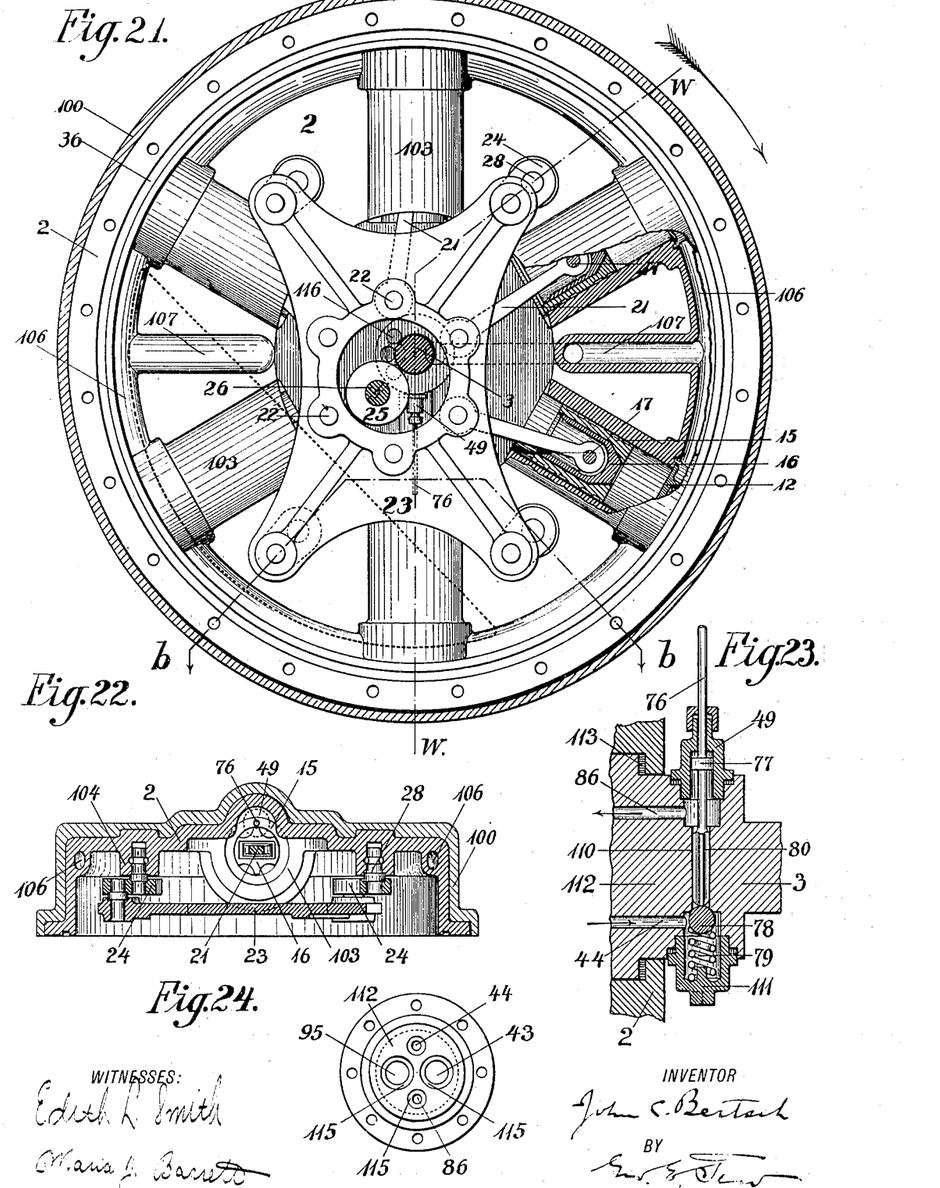

It is evident, that a great variety of modifications in the several parts of the complete apparatus can be made to meet the many different requirements for all kinds of domestic and industrial applications, without departing from my invention in the least. One of such modifications I show in Figs. 17 to 24 inclusive. If four compressors do not give the desired capacity of an apparatus, and it is desired to have the whole machinery and particularly the discharge valves 12 of the compressors accessible without disturbing the condenser and refrigerator, the external surface of the compressor housing is not used as refrigerating surface, but is instead insulated with a non-heat conducting material 100, as shown by Figs. 17 and 21. Only one half of casing 1 is used, and connected, tightened and locked to shaft 3 and cap 34 by nut 93 in exactly the same manner as described before. The other half of machinery housing M, is formed by a modified compressor body 2, provided with any number of cylinders 103, bolted to casing 1 and tightened by gasket 36, forming a hermetically sealed housing for compressors and all working parts, with bearings 94 and 50 resting upon stands 101 and 102, a shaft 3 forming a tie between the two opposite parts of housing M, and the whole being rotated by a pulley or gear 55, as described for casing 1. Compressor cylinders 103 have pistons 15 and suction valves 16 with pins 17 directly engaging with connecting rods 21, which are operated by pins 22, rigidly connected to a single crank plate 23, held in an eccentric position to the compressors by four single cranks 24, turning with their shafts 28 in bearings 104 provided for on the compressor body 2, as shown by Figs. 17 and 22. Discharge valves 12 with covers 105, (Fig. 17) form the discharge chambers 8 on the circumference of housing M, being connected together by a radial passage 106, (Figs. 17 and 21) which is connected with passage 10 in one end of shaft 3 by passages 107 within the body 2, and also by a radial passage 108, of which one half is formed by a groove on the circumference of shaft 3, and the other half by an internal groove in the body collar 109, as shown by Figs. 17, 19 and 20.

The compression of the vapors taking place during the outward travel of pistons 15, instead of during the inward travel as described before, roller 25, with pin 26, actuating crank plate 23, are placed below shaft 3, for performing the compression in the lowest, and the suction of the vapors in the highest part of the rotating housing M, which is preferable for preventing the liquid fluid and lubricant from entering the compressor cylinders 103.

Shaft 3 forms a tie between the opposite halves of housing M, carrying as before the bearing collars 27 with weight 30, but the discharge passage 10, vapor passage 32, liquid passages 44 and 86, and the self closing liquid stop valve 49, with a connecting passage 110 for stem 76, are all in the end of shaft 3 connecting with body collar 109, as shown by Figs. 17, 18 and 20. Passage 32 terminates in a number of smaller passages 116, extending to the interior of housing M, and forming the inlets for the vapors produced within evaporator pipes 33, into the housing M, which forms a vapor storage for the supply of the compressor cylinders 103, as shown by Figs. 18, 19 and 21.

Valve 49 is operated by one piston 15, which pushes stem 76 inward with every revolution, removing ball 78 from its seat, and allowing the liquid fluid to pass through ports 80, within passage 110, into passage 86 and thence into evaporator pipes 33. On the outward travel of piston 15, stem 76 is released, ball 78 is seated by spring 79 within housing 111, assisted by the condensing pressure within passage 44, and passages 110 and 86 are closed.

It is apparent, that the machinery housing M, being independent from condenser C and refrigerator R, can be dismantled and the discharge chambers 8 opened without disturbing the balance of the apparatus.

It is also apparent, that the shape, size and number of condenser tank 70 with pipe coils 45, and also the shape, size and number of refrigerator tank 87 with pipes 33, are not dependent upon the shape and size of the housing M, from which they can be disconnected and removed, after the valved passages within condenser shaft 42 and within refrigerator shaft 112 are closed, without disturbing any part of the machinery within housing M.

The condenser C and refrigerator R are connected to housing M in series, and it is immaterial which of them is located next to housing M. In Fig. 17 I show an arrangement with refrigerator R next to housing M, and the condenser C at the end of the complete apparatus, each only in one unit, whereas each may consist of a number of units.

Shaft 112, connecting with shaft 3 and body collar 109, contains passages 43, 44, 86 and 95, (Figs. 20 and 24) as extensions of passages 10, 44, 86 and 32 respectively in the end of shaft 3, and is pressed with gasket 113 against shaft 3 and body 2, tightly closing housing M. Gasket 114, between shafts 3 and 112, closes tightly all passages in both shafts against each other, and also against the outside atmosphere. Shaft 112, preferably provided with vapor and liquid stop valves, similar to valves 56 and 57, with caps 58 and 59, as shown in Fig. 1, carries the evaporator pipes 33, wound in coils and mounted upon carrying plates 61, if used as a refrigerator, or it carries the condensing pipes 45, if used as a condenser, as described before.

To shaft 112, shown as a refrigerator shaft in Fig. 17, is connected by a coupling 117, the condenser shaft 42, which carries the condenser pipes 45, as described before.

If shaft 112 is used as a condenser shaft, a refrigerator shaft similar to shaft 93$^a$, described before, is connected to shaft 112 by a coupling 117, or a number of shafts 112 may be coupled together and connected to housing M, and a number of shafts similar to shaft 42, or to shaft 93$^a$, may be coupled together by couplings 117, and connected to shafts 112 as described, all shafts being rotated simultaneously with machinery housing M.

All passages of shafts 3, 112 and 42, are provided at their ends with annular rings 115, (Figs. 19 and 24) which fit within corresponding recesses in the connecting shaft, the gaskets 114, for tightening the shaft connections, are fitted to the outside of the rings 115, and pressed against the end faces of the shafts, thereby making tight connections between the shafts, and preventing the gaskets from slipping into any one passage, or to be blown out by the pressure of vapors and liquid fluid within the passages.

Having thus described the construction of all parts of my apparatus, I will now outline their operation.

The apparatus is charged with the required amount of fluid and lubricating oil through passage 96, which is preferably valved, after the air has been exhausted from all pipes, passages, compressors, casing and housing. Flowing water is turned on to supply condenser tank 70, brine is supplied to refrigerator tank 87, and any kind of power is supplied to pulley or gear 55, after valve 56 is opened wide, and valve 57 set for the required amount of fluid supply. While the apparatus is at rest, weight 30 hangs vertically upon shaft 3, and valve 49 is closed and prevents the fluid from entering casing 1 and pipes 33. When the apparatus is in motion, stems 76 of valves 49 are pushed inward with every revolution and supply the casing 1 and pipes 33 with liquid fluid, where it meets relatively warm surfaces which cause evaporation under ebullition. The heat required for the vaporization of the liquid fluid is taken from the brine surrounding casing 1 and pipes 33, whereby the brine is cooled for use of refrigeration wherever required. The vaporized fluid collecting in casing 1 or in housing M is compressed by the compressors and delivered to pipes 45 where the vapors are cooled by the condensing water in tank 70 and become condensed to liquid, which is vaporized over and over again as described before. While the apparatus revolves, weight 30 takes a more and more inclined position, until the compressors are under full load, under which weight 30 takes a position of about 45 degrees, or midways between the vertical and horizontal. If the compressor load should increase over and above full load, weight 30 rises till it reaches a horizontal position, in which the load is about 40 per cent above full load. The least further increase of load causes weight 30 to revolve with the compressors, which then cease to work until the pressure in pipes 45 decreases, which stops weight 30 from rotation and permits the compressors to work again. The resultant of all the forces acting upon weight 30 through rollers 25 and pins 26 is greatest after one compressor has discharged its contents of vapor, or when the axis of the compressor has just passed the axis formed by pin 26 and the centroid of weight 30. Valves 49, placed between the axis of the compressors and the axis through the centroid of weight 30, remain closed while weight 30 is rotating, and prevent the fluid supply during this period, because stem 76 can not come in contact with cam 75. Under normal condition weight 30 hangs upon shaft 3 practically at rest, while the compressors, with shaft 3, 42 and 93ª, or with shafts 3, 112 and 42, coupled together, revolve. Rollers 25, actuated by weight 30, hold crank plates 23 eccentric to the axis of the compressors by means of the four cranks 24, the pins of which describe a circle of a diameter equal to the stroke of the compressors. Connecting rod pins 22, connected to crank plates 23, must describe the same circle as the pins of cranks 24, thereby communicating through connecting rods 21 a reciprocating motion to pistons 15 and suction valves 16. On the suction stroke, the compressors being single acting, the pistons 15 are left a little behind of suction valve 16, forming with the ports within the latter, a passage for the vapors in casing 1 or in housing M to enter the compressors. On the discharge stroke, valves 16 seat themselves in pistons 15, closing the compressor cylinders and compressing the vapors. When the pressure within the compressors reaches the condenser pressure or a point just a little above that, discharge valves 12 open, allowing the compressed vapors to pass out into chambers 8 and through passages 10 and 43 into condensing pipes 45, where they condense.

It is evident, that the cold vapors within casing 1 or within housing M keep the compressors, all working parts and the lubricating oil very cold, thereby assisting in the thorough separation of fluid and lubricant, preventing vaporization of the oil and the formation of non-condensable gases, which is a common occurrance with the older type of apparatus which have the compressors within the hot condenser. It is also evident, that the compressors cannot be heated and the vapors entering same be rarefied, and that no superheated vapors can exist while all parts are surrounded with highly saturated vapors and particles of liquid fluid, which take up the heat of compression and deliver nearly saturated vapors to the condenser pipes. The entire cycle of operation is saturatic, which, as is well known, is the ideal performance of gas compressors, calling for the least expenditure of energy for their operation. If too much liquid fluid should enter the pipes 33, any surplus or not vaporized part passes into casing 1 or into housing M, and can safely pass through the compressors and discharge valves 12, which form the compressor heads.

It is apparent that weight 30 acts as a safety device against excessive pressures in the condenser pipes 45, and valves 12 act as a safety device against any damage to the compressors.

The entire apparatus, being completely sealed against any escape of fluid and lubricant, and being admirably adapted for electric motor drive, requires no attendance beyond that required for the power supply and for the lubrication of the few outside bearings. In the absence of any fluid connection on the outside of the apparatus, it can be located anywhere, within or without the spaces to be refrigerated, and a large refrigerating capacity may be had by the distribution of any number of independent units, operated by electric motors direct at the places where refrigeration is needed.

My invention is also very suitable for the refrigeration of cars, as it is portable and may be driven by belt, gear or chain from the wheel axles of a car.

For marine refrigeration is my invention most suitable, because it has no outside connections for the working fluid, of which no loss is possible and therefore no fluid for recharging the apparatus must be carried for a sea voyage of any duration.

What I claim is:

1. A refrigerating apparatus comprising a rotary casing forming the evaporator, a tank within which said casing is contained, a compressor rotating with said rotary casing and located within the same, and operated by said rotation, a rotary condenser, a valved passage for the compressed vapors from the compressor to the condenser, and another valved passage for the liquid of the refrigerating fluid from the condenser to said evaporator.

2. A refrigerating apparatus comprising a rotary evaporator casing, a central shaft connecting opposite ends thereof, a compressor carried by and rotating with said shaft and in said casing, a weight hung on said shaft and operatively connected to the compressor, and a rotating condenser having valved passages communicating with said compressor and said rotary casing respectively.

3. In a rotary refrigerating apparatus, the combination of a rotary casing forming an evaporator, with refrigerating pipes wound over the exterior surface of said casing for increasing the evaporating surface, the ends of said pipes communicating with the interior of said casing for circulating the liquid refrigerant within said pipes for vaporization.

4. In a rotary refrigerating apparatus, the combination of a rotary casing forming the evaporator, a compressor therein operated by rotation thereof, for forcing gas to the condenser, condensing pipes wound in coils, and a shaft carrying said pipes and coupled to said rotary casing, said shaft having passages connecting the pipes with the casing and compressors respectively, for circulating the refrigerating fluid.

5. A refrigerating apparatus comprising a rotary casing forming an evaporator, compressors within said casing and operated by the rotation thereof, a rotary condenser, and a shaft connecting said casing and condenser, said shaft connecting opposite ends of the casing and having a passage for the discharge of the compressed vapors to the rotary condenser and also a passage for conducting the condensed vapors of the refrigerating fluid from the condenser to the interior of the casing.

6. A refrigerating apparatus comprising a rotary evaporator casing, a shaft connecting opposite ends of said casing, compressors carried by said shaft in said casing and rotating with said casing, a weight hung on said shaft, operating devices between the weight and compressors, a condenser, and circulation passages connecting said condenser, compressors and casing.

7. In a rotary refrigerating apparatus, the combination of a shaft, a casing thereon containing compressors and means to operate same, said casing forming the first part of an evaporator, pipes wound around the exterior of said casing forming a second part of the evaporator, pipe coils wound around the shaft and connected to one side of said casing forming a third part of the evaporator, said shaft being connected to said casing and containing passages for liquid fluid supply through said casing and vapor delivery to said casing, a condenser connected to the other side of said casing, and communicating with said passages in the shaft for the discharge of the compressed vapors to the condenser and for the return of the liquid fluid to said casing and to said evaporator coils, means for regulating the supply of liquid fluid to said three parts of the evaporator, and means for transferring the refrigerant from the said three parts of the evaporator to said vapor passage in the shaft.

8. In a rotary refrigerating apparatus, the combination of a casing, a shaft tying the ends of said casing together, a compressor carried by said shaft and rotating with said casing, means to operate said compressor, condensing pipe coils located on one side and refrigerating pipe coils located on the other side of said casing, shafts carrying said condenser pipe coils and refrigerator pipe coils, said condenser coil shaft having a valved passage for the compressed vapors from the compressor to said condensing pipes and another valved passage for the condensed vapors from said condensing coils to said refrigerating coils, said refrigerator coil shaft having a valved passage for supplying said refrigerator pipes with liquid fluid from said condensing coils and another valved passage for delivering the vapors from said refrigerating pipes to said compressor within said casing, said compressor shaft having a passage for discharging the compressed vapors into said vapor passage of the condenser coil shaft and a passage for receiving the vapors from said refrigerating pipe coils through said vapor passage within refrigerator coil shaft, and means for coupling said compressor shaft.

9. In a rotary refrigerating apparatus, a casing, a compressor and means for operating the same, in said casing, a shaft extending across said casing, a condenser, said shaft having a passage for discharging the compressed vapors to the condenser and also a passage for receiving the fluid from the condenser, self closing stop valves controlling the outlet from said fluid passage to the interior of said casing for intermittently supplying the evaporator with liquid fluid from the condenser, a weight hung on said shaft, and a cam connected to said weight for opening said self closing stop valves.

10. In a rotary refrigerating apparatus, a shaft, a casing thereon forming an evaporator, compressors in the casing, carried by said shaft, two rings having bearings on the shaft, a weight suspended by said rings and crank plates eccentrically mounted on said rings and operatively connected to the compressors for operating the same, said crank plates being carried with the shaft.

11. A refrigerating apparatus, comprising a rotary evaporator casing, a condenser connected thereto and rotating therewith, and a compressor located within the evaporator casing, and adapted to circulate fluid through the evaporator and the condenser, said compressor being operated by the rotation of the casing.

12. In a refrigerating apparatus, the combination of a refrigerator and a condenser arranged to rotate and having an axial connection with circulation passages therein permitting flow between the condenser and the refrigerator, and a pump located within the refrigerator and adapted to be operated by rotation thereof, to produce said flow.

13. In a refrigerating apparatus, the combination of a rotary casing, and its shaft, the latter having circulation passages one of which opens into the casing, a pump cylinder carried by the shaft and communicating with the other passage, a piston working therein, a weighted ring suspended from the shaft, and a crank plate mounted eccentrically on the ring and rotating with the shaft and connected to the piston to operate the same.

14. In a refrigerating apparatus, the combination of a rotary casing, and its shaft having circulating passages one of which is provided with a valve which opens into the casing, a compressor carried by the shaft, a weighted ring suspended on the shaft, means carried by said ring to open said valve at each rotation of the shaft, and crank devices carried by the shaft and operated by the ring when the shaft is rotated, to operate the compressor, the latter communicating with the other of said passages.

15. In a refrigerating apparatus, the combination of a rotary casing and its shaft, the latter having an outlet passage and also an inlet passage, a plurality of compressor cylinders arranged around and carried by said shaft and communicating with said outlet passage, pistons working in the cylinders, a weighted ring hung on said shaft and having an eccentric bearing roller, a plate rotating with the cylinders and connected to the pistons to operate the same, said plate traveling on said roller, for the purpose stated.

16. In a refrigerating apparatus, the combination of a rotary casing and a shaft extending within the same, a plurality of compressor cylinders arranged around said shaft and rotating therewith, a frame connecting said cylinders, a plate extending around the shaft beside said cylinders, cranks connecting the plate and the frame, and a weighted ring hung on the shaft and having an eccentric bearing on which said plate is supported, to operate the plate as the cylinders are rotated.

17. In a refrigerating apparatus, in combination, an evaporator, a condenser connected thereto, and a compressor arranged to circulate a volatile fluid through the evaporator and condenser, said compressor being inclosed in the evaporator and exposed to the cooling action of the fluid therein.

18. In a refrigerating apparatus, a shaft and means to rotate the same, a condensing coil mounted on the shaft, means to cool the coil, and means to circulate a volatile fluid through the coil as it rotates, in a direction opposite to the direction of rotation.

19. A refrigerating apparatus comprising an evaporator, a condenser connected thereto, a casing connected to the evaporator and condenser, a compressor located within the casing and adapted to circulate a volatile fluid through said evaporator and condenser, and a motor operating said compressor and located external to the casing and also external to said evaporator and condenser.

20. In a refrigerating apparatus, the combination of a rotary evaporator casing, a compressor in said casing and means to operate the same by the casing, a condenser communicating with the compressor, and an evaporating coil external to the casing and communicating at one end therewith and at the other end with the condenser.

21. In a refrigerating apparatus, the combination of a shaft, a condenser mounted thereon, an evaporator casing mounted thereon, an evaporator coil also mounted thereon, a compressor in the casing and operated by rotation of the shaft, a passage from the compressor to the condenser, a return passage from the condenser to the coil, and a passage from the coil to the casing.

22. In a refrigerating apparatus, the combination of a closed evaporator casing adapted to contain lubricant, and having projections therein, a shaft on which the casing is mounted, a compressor mounted on the shaft, mechanism to operate said compressor when the shaft is rotated, and means to lubricate said mechanism, including a weighted wiper projecting toward the inner surface of the casing and adapted to collect lubricant from said projections.

23. In a refrigerating apparatus, a condenser comprising a shaft having inlet and outlet passages, a spiral coil mounted on said shaft and connected at its opposite ends to said passages respectively, the coils increasing in diameter, toward the outlet end thereof, whereby the condensed fluid tends to flow toward the outlet as the condenser is rotated.

24. In a refrigerating apparatus, the combination of a closed evaporator casing adapted to contain lubricant, a shaft extending through the casing and on which it is mounted, a compressor mounted on and carried by the shaft, in the casing, mechanism to operate said compressor when the shaft is rotated, said mechanism being located in part on opposite sides of the compressor, and a weighted yoke through which the compressor passes at each revolution, said yoke being suspended on the shaft and projecting toward the casing to wipe lubricant therefrom and having guides for the lubricant leading to the bearings of said mechanism.

25. In a refrigerating apparatus, in combination, an evaporator, a condenser connected thereto, a compressor within said evaporator and arranged to circulate a volatile fluid through the evaporator and condenser, a motor operating said compressor and located external to said evaporator and condenser, said compressor being exposed to the fluid under ebullition and saturated fluid vapor within said evaporator for the purpose of absorbing the heat produced by operating the compressor.

26. In a refrigerating apparatus, a receptacle adapted to contain a volatile fluid under pressure, comprising a shaft provided with a liquid passage and with a vapor passage for the fluid, a disk shaped pipe-support mounted on the shaft, pipes wound in a spiral coil of outwardly increasing diameters mounted on said pipe support, and connected at the end of the largest spiral to said liquid passage, and at the end of the smallest spiral with said vapor passage, means to rotate said spiral coil, pipe support and shaft within a fluent material, means to circulate a volatile fluid through said spiral coil as it rotates, for exchanging heat with said fluent material, whereby the specific heavier liquid fluid occupies the spiral of largest diameter, and the specific lighter gaseous fluid occupies the spirals of smaller diameter.

27. In a refrigerating apparatus, a receptacle adapted to contain a volatile fluid under pressure, comprising a shaft provided with a liquid passage and with a vapor passage for the fluid, disk-shaped pipe supports mounted on the shaft, pipes wound in spiral coils of outwardly increasing diameters mounted on said pipe supports, and connected at the ends of the largest spirals to said liquid passage and at the ends of the smallest spirals to said vapor passage, means to rotate said spiral coils, pipe supports and shaft within a fluent material, means to circulate a volatile fluid through said spiral coils as they rotate, for exchanging heat with said fluent material, whereby the specific heavier liquid fluid occupies the spirals of largest diameters and the specific lighter gaseous fluid occupies the spirals of smaller diameters.

28. In a refrigerating apparatus, in combination, a casing adapted to contain a volatile fluid under ebullition, an evaporator and a condenser connected thereto, a pump within said casing and adapted to transfer the fluid vapors from said evaporator and casing into said condenser, a motor operating said pump and located external to said casing, evaporator and condenser, means for equalizing the fluid pressures within said casing and evaporator, and means supplying said casing with liquid for the purpose of cooling said pump by the latent heat of the liquid vaporizing within said casing under the pressure existing within the evaporator.

In testimony whereof, I affix my signature in presence of two witnesses.

JOHN C. BERTSCH.

Witnesses:
F. N. SMITH,
BERT SMITH.